(12) United States Patent  
Julien et al.

(10) Patent No.: US 8,565,570 B2  
(45) Date of Patent: Oct. 22, 2013

(54) OPTICAL BACKPLANE

(75) Inventors: Martin Julien, Laval (CA); Robert Brunner, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 375 days.

(21) Appl. No.: 12/841,279

(22) Filed: Jul. 22, 2010

(65) Prior Publication Data

US 2012/0020673 A1    Jan. 26, 2012

(51) Int. Cl.
*G02B 6/00*    (2006.01)

(52) U.S. Cl.
USPC .......................................................... 385/135

(58) Field of Classification Search
USPC .......................................................... 385/135
See application file for complete search history.

(56) References Cited

U.S. PATENT DOCUMENTS

| | | | |
|---|---|---|---|
| 5,937,130 A * | 8/1999 | Amberg et al. ................ 385/134 |
| 6,229,942 B1 * | 5/2001 | Engberg et al. ................. 385/39 |
| 6,233,376 B1 * | 5/2001 | Updegrove ...................... 385/14 |
| 6,623,177 B1 * | 9/2003 | Chilton ............................ 385/88 |
| 6,848,841 B2 | 2/2005 | Cochran et al. |
| 7,453,870 B2 * | 11/2008 | Alappat et al. ................. 370/360 |
| 7,680,367 B2 * | 3/2010 | Matsuoka et al. .............. 385/14 |
| 2002/0182899 A1 * | 12/2002 | Debord et al. ................... 439/65 |
| 2003/0174953 A1 * | 9/2003 | Carnevale et al. .............. 385/39 |
| 2004/0047569 A1 * | 3/2004 | Cochran et al. ................. 385/88 |
| 2005/0100340 A1 * | 5/2005 | Nishimura ..................... 398/135 |
| 2005/0254827 A1 * | 11/2005 | Hopkins et al. ................ 398/164 |
| 2006/0039705 A1 | 2/2006 | Goodwill et al. |
| 2009/0148116 A1 * | 6/2009 | Yanagimachi et al. ........ 385/135 |

FOREIGN PATENT DOCUMENTS

WO    01/27669 A1    4/2001

* cited by examiner

*Primary Examiner* — Charlie Peng  
(74) *Attorney, Agent, or Firm* — Ericsson Canada Inc.; Alex Nicolaescu

(57) ABSTRACT

The invention relates to an optical backplane, comprising a plurality of component connectors and at least two interconnections configurations interconnecting the component connectors. The at least two interconnections configurations allow a dynamical selection of an interconnections configuration interconnecting the component connectors.

14 Claims, 4 Drawing Sheets

OPTICAL BACKPLANE

TECHNICAL FIELD

The present invention relates to telecommunication systems and more specifically to backplanes used for building such systems.

BACKGROUND

In a large system, such as a telecommunication system, it is common to enclose components, such as Printed Circuit Boards (PCBs), blades, or nodes, constituting the system inside a chassis 5, such as illustrated in FIG. 1. The chassis 5 allows designing scalable systems i.e. systems into which additional components can be added.

In order to allow the different components to communicate between them, each component is connected to a backplane 10, also illustrated in FIG. 1. A backplane is typically a PCB having slots into which other components such as PCBs, blades or cards, are plugged, and is typically just a connector without active surface mounted devices on it. The function of the backplane 10 is to carry the communication signals between the components. Typically a backplane is passive i.e. it does not require any external electrical power and it is built in such a way that copper traces can be used to exchange information between the components.

In most telecommunication systems, the backplane is designed to support a network topology such as a star, a dual-star 50 as illustrated in FIG. 2, a dual-dual-star or a fully-connected 75 network topology, as illustrated in FIG. 3. Depending on the network topology used when designing the backplane, more or less copper traces might be required, as shown in the FIGS. 2 and 3, where each circle represents a component and the lines in between the circles represent the interconnections between the components.

When the number of copper traces is important, such as in the case of a fully-connected network topology, the energy consumption also becomes important, as copper require a lot of energy in function of the distance to cover. In addition, copper traces are sensitive to interferences and offer a limited bandwidth capacity, which means that several parallel traces might be required to fulfill a given bandwidth requirement. Furthermore, since copper-based backplanes are passive, they provide a network topology adapted for use with a fixed or slightly variable number of components connected to it.

SUMMARY

It is therefore an object of this invention to provide an optical backplane, a method for sending and a method for receiving an optical signal to overcome at least some of the drawbacks of the prior art.

Accordingly an optical backplane is provided, comprising a plurality of component connectors and at least two interconnections configurations interconnecting the component connectors. The at least two interconnections configurations allowing a selection of an interconnections configuration interconnecting the component connectors.

A method for sending an optical signal from a sending component to a receiving component is also provided. The components are connected to an optical backplane through component connectors. The method comprises the steps of selecting one of at least two interconnections configurations interconnecting the component connectors of the optical backplane and sending the optical signal to the receiving component through the selected interconnections configuration.

A method for receiving an optical signal at a receiving component from a sending component is further provided. The components are connected to an optical backplane through component connectors. The method comprises the steps of selecting one of at least two interconnections configurations interconnecting the component connectors of the optical backplane on which an optical signal is being transmitted at a given time and receiving the optical signal from the sending component through the selected interconnections configuration.

BRIEF DESCRIPTION OF THE DRAWINGS

The objects and advantages of the invention will be understood by reading the detailed description in conjunction with the figures, wherein.

DETAILED DESCRIPTION

Figure 1:
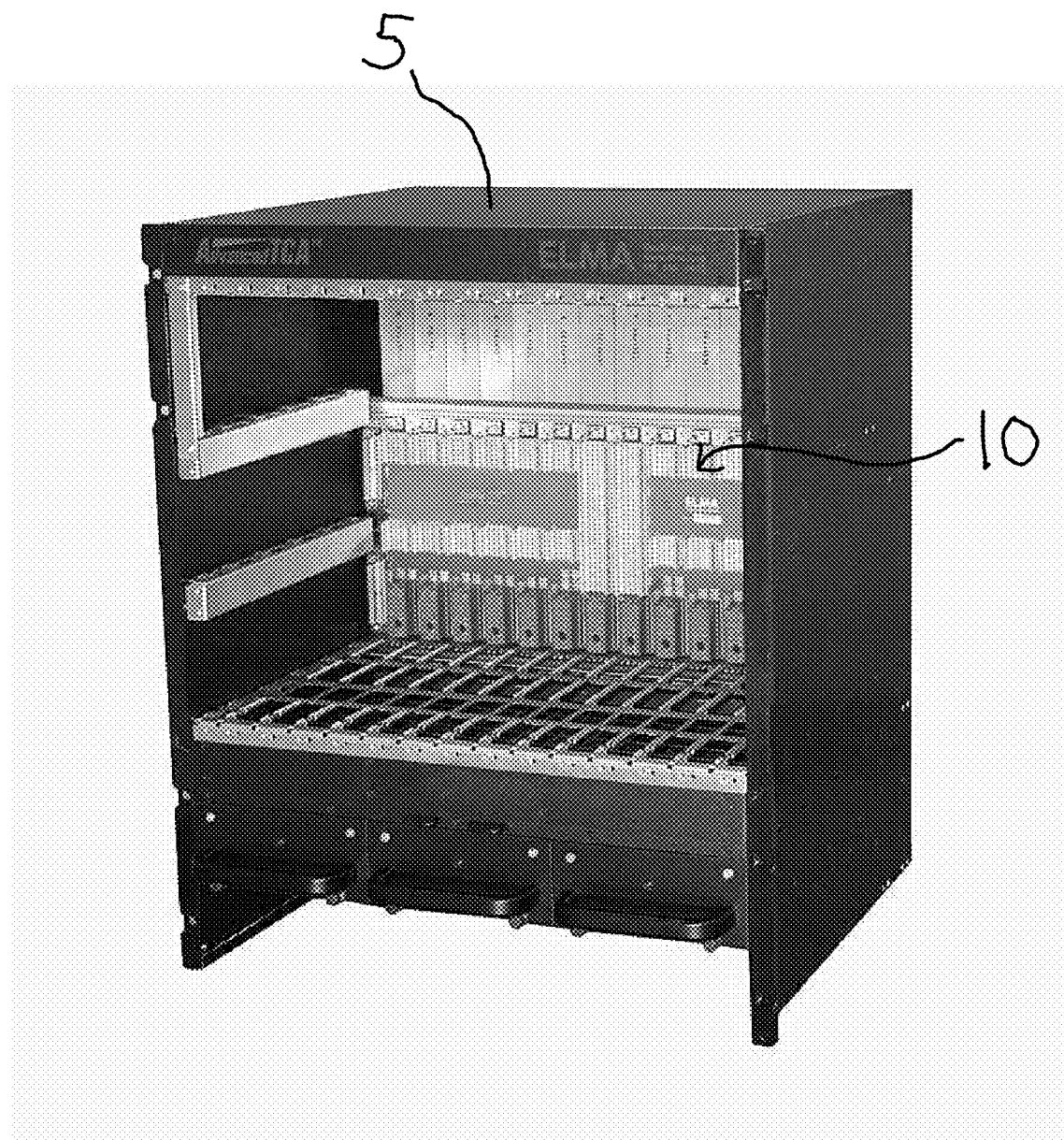
FIG. 1 is a perspective view of an equipment that includes a backplane according to the prior art.
Figure 2:
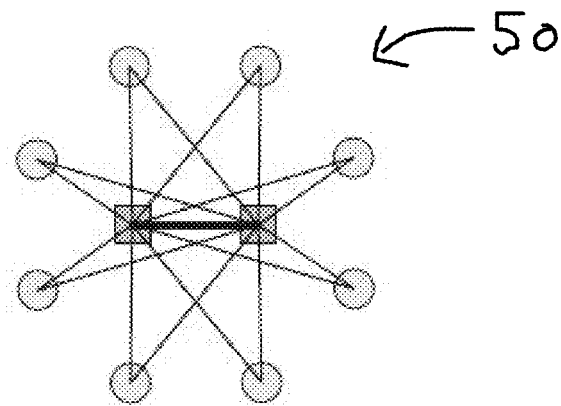
FIG. 2 is a schematic representation of a dual-star network topology.
Figure 3:
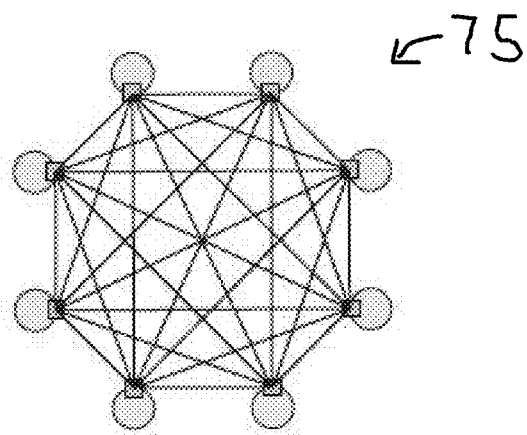
FIG. 3 is a schematic representation of a fully-connected network topology.

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

The embodiments according to the present invention are described with reference to block diagrams and/or operational illustrations of methods, servers, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Nowadays, telecommunication systems process a huge amount of data traffic and it is forecasted that the amount of data will explode in the near future. As the quantity of data processed increases, the energy consumption of telecommunications systems also increases. One reason for this increase in energy consumption is that telecommunications systems still widely use copper traces for transmitting data. It is well known that copper traces require a lot of energy in function of the distance they cover.

On the other hand, fiber optics is already used to interconnect systems requiring a large network bandwidth and covering long distances. Fiber optics consumes far less energy than copper traces. As fiber optics technology develops and becomes more affordable and as internal systems process more and more data, fiber optics technology is now becoming a viable solution for replacing traditional copper traces in a variety of systems.

This invention takes advantage of the fiber optics technology, in order to simplify the design of backplanes, where optical interconnections replace traditional copper traces, offering a much higher bandwidth per trace. Additionally, optical interconnections are not sensitive to electro-magnetic interference and do not consume as much energy.

Furthermore, traditional copper-based backplanes, which are typically passive, are not reconfigurable in a dynamic way. In order for some communication technologies to make an optimal use of the components such as Printed Circuit Boards (PCBs), blades or nodes, interconnected through the same backplane, it would be advantageous to be able to dynamically reconfigure backplanes efficiently. Furthermore, a multiple layered backplane could more easily account for a multiplicity of traces to interconnect components in multiple configurations.

Taking advantage of the large bandwidth allowed by optical-based technologies, it is expected that the number of optical traces required on a backplane to fulfill the requirements of certain network topologies would be far less than for copper-based technologies. Also, as electro-magnetic interference is not an issue for optical signals, the design complexity of an optical backplane is mainly proportional to the number of optical links.

Currently, there exists at least one technology using a polymer material, the polymer waveguide technology, which can be used to integrate optical signals in backplanes, making the building of a backplane similar to the process used for the traditional copper-based backplanes. Those skilled in the art will know how to use this technology for building optical traces on components.

Therefore, the technology to building optical backplanes e.g. the polymer waveguide technology is already available and can be used to build optical backplanes. However, it is currently not possible to reconfigure dynamically the interconnections between components for such backplanes. This poses a problem in the case where the interconnections between the components should depend on the number of components. Currently, backplanes are designed with one interconnection configuration and if another configuration is needed, another backplane has to be used. Therefore, there is a need for a way to reconfigure the backplane based on the number of components connected to the backplane or based on bandwidth capacity requirement depending on a type of components or an interconnection topology.

As typical backplanes remain passive, i.e. without requiring electrical power, for cost and maintenance considerations, a solution is to support at least a few or all possible static configurations on the same backplane at once. Using such a backplane, the components connected to it become responsible for selecting which static configuration on the backplane will be used, thus making the backplane behave as if it would be dynamically reconfigurable.

Figure 4:
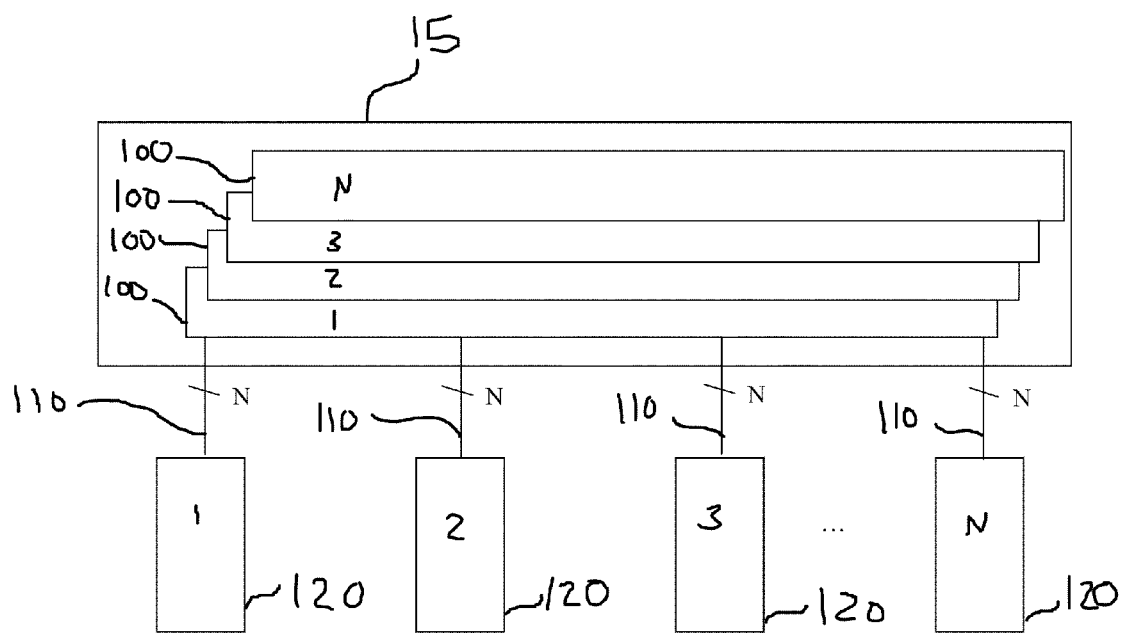
FIG. 4 is schematic representation of a reconfigurable passive optical backplane according to the invention.

Using the existing polymer technology or any other equivalent technology, it thus becomes possible to design a reconfigurable optical backplane by simply integrating all possible network topology configurations at once on the same backplane. FIG. 4 illustrates an optical backplane 15, comprising a plurality of component connectors 110 and at least two interconnections configurations 100 interconnecting the component connectors 110. The at least two interconnections configurations 100 allow a selection of an interconnections configuration 100 interconnecting the component connectors 110.

Preferably, each one of the at least two interconnections configurations 100 interconnecting the component connectors 110 are optical, passive and static. The selection of an interconnections configuration 100 interconnecting the component connectors 110 is preferably based on a number of components 120 connected to the component connectors or is based on bandwidth capacity requirement depending on a type of components or on an interconnection topology. Another possibility for selecting the right interconnections configuration could also be based on the type of components 120, which could potentially be requiring more or less bandwidth capacity based on the type of components 120, or based on the interconnection topology.

The interconnections configurations 100 are preferably network topology interconnections configurations. For example, in the case where the backplane would be built to support a fully-connected network topology, there could be several network configurations for a scalable number of components in the chassis. In other words, depending on the number of network components such as PCBs, blades or nodes, connected to the backplane, one particular network topology configuration would be used. To be clearer, for example, on a backplane, there could be one dual-star network topology providing interconnections for eight component connectors, another dual-star network topology providing interconnections for ten component connectors and several fully connected network topologies providing interconnections for respectively eight, nine, ten, eleven and twelve components connectors. Any number and combination of interconnections configurations could be designed in the backplane, as it would be apparent to a person skilled in the art.

As shown in the FIG. 4, in a N-components 120 interconnections configuration 100, the configuration N on the backplane 15 could be used, for example, by each component 120, in order to properly interconnect the components 120 as expected for optimal performance. However, in a two-components 120 interconnections configuration 100, the configuration 2 could be used instead, for example, the other interconnections configurations 100 remaining unused. The number of interconnections configurations does not have to be the same as the number of components 120. It should be clear that even for a N-component system, M interconnections configurations could be possible, with M greater then zero.

As stated above, preferably, the optical backplane is built using a polymer waveguide technology. But other available technologies could also be used. Preferably also, the component connectors 110 each comprise a plurality of links, each link being connected to a different interconnections configuration 100. The component connectors 110 may thus each comprise a single ribbon-fiber cable containing multiple fiber waveguides where each link corresponds to one fiber waveguide, for example. It should be understood that each link described above could contain a plurality of physical links, if needed, and that the actual number of physical links should be dictated by the capacity of such unitary physical link and by the bandwidth requirements for each components 120.

The selection of which interconnections configuration 100 to use may be managed by the components themselves, either on the sending or receiving side. Each component 120, or network node, can be connected to the backplane 15 using a certain number of links in a component connector 110. If we assume that each link is connected to a different backplane interconnections configuration 100, it becomes possible for each component to select which configuration it needs to use for exchanging information with the other components. For example, as components are added or removed to/from the system, each component could select a different backplane interconnections configuration 100.

Preferably, a particular backplane configuration could imply direct interconnection between the components 120 involved in the configuration, and/or some form of point to multipoint configuration. Thus, at least some of the interconnections configuration 100 may comprise an optical crossbar on the backplane 15 to redirect optical waveguides between the component connectors 110. The optical crossbar on the backplane would be specified in order to redirect the different optical waveguides efficiently between the components, as it would be apparent to a person skilled in the art.

The component connectors may be component slots or other means for connecting for instance a blade or Printed Circuit Board (PCB) to a backplane. The components 120 may be PCBs or other components that may be connected to a backplane.

The optical backplane may comprise a single layer holding one or several interconnections configurations. The optical backplane 15 may also comprise at least two layers where, for example a first and a second interconnections configuration 100 are located respectively in a first and a second layer of the optical backplane 15. This has the advantage of increasing the number of configuration possible on the backplane 15. Interconnections configurations 100 spreading on multiple layers of the multi-layer backplane 15 are also considered as being part of the invention.

Assuming that the backplane has to remain passive, i.e. without requiring any electrical power, developing a backplane that would integrate all possible component configurations, or at least a restricted number of configurations, seems to be extremely efficient and low cost.

Figure 5:
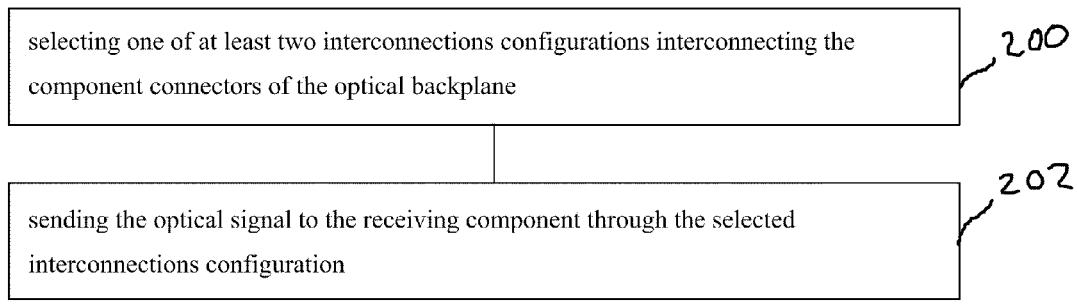
FIG. 5 is a flowchart illustrating steps of a method according to the invention.

FIG. 5 illustrates steps of a method for sending an optical signal from a sending component to a receiving component. The components are connected to an optical backplane through component connectors and the method comprises the step 200 of selecting one of at least two interconnections configurations interconnecting the component connectors of the optical backplane and the step 202 of sending the optical signal to the receiving component through the selected interconnections configuration. The step of selecting one of at least two interconnections configurations may be based on a number of components connected to the component connectors or may be based on bandwidth capacity requirement depending on a type of components or on an interconnection topology. The sending component may then be responsible for selecting the right interconnections configurations, while the receiving component simply listens on all the interconnections configurations to receive the optical signals, trusting the sending component to select only one such interconnections configuration.

Figure 6:
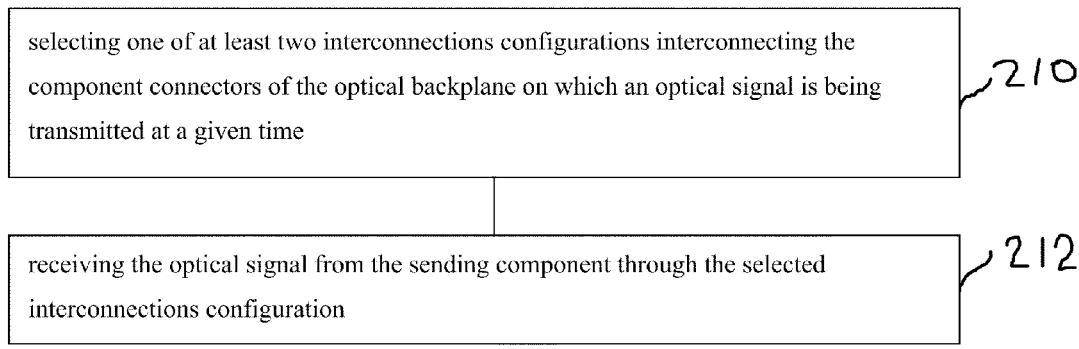
FIG. 6 is another flowchart illustrating steps of a method according to the invention.

FIG. 6 illustrates steps of a method for receiving an optical signal at a receiving component from a sending component. The components are connected to an optical backplane through component connectors and the method comprises the step 210 of selecting one of at least two interconnections configurations interconnecting the component connectors of the optical backplane on which an optical signal is being transmitted at a given time and the step 212 of receiving the optical signal from the sending component through the selected interconnections configuration. The step of selecting one of at least two interconnections configurations may be based on a number of components connected to the component connectors or may be based on bandwidth capacity requirement depending on a type of components or on an interconnection topology. The sending component thus sends the optical signals through all the different interconnections configurations, and the receiving component accepts optical signals from only one of the interconnections configurations. Basically, even though the optical signals go through all the interconnections configurations, the optical signals should be considered valid on only one of the interconnections configuration.

As mentioned earlier, the sending component or sender may be responsible for selecting the backplane configuration, in which case the receiving component or receiver simply receives light from all the interconnections configurations 100, assuming that only one interconnections configuration at a time is being used. On the other hand, it could be left to the receiving components to filter out the information, in which case the sending components would send light to all configurations, and the receiving components would have to select the right configuration. The solution where the selection is made on the receiving side is possible, but not really efficient, as it requires more powerful optical signals in order for the light to go through all the different backplane interconnections configurations 100.

For example each component may be connected to the backplane using a single ribbon-fiber cable. A ribbon-fiber cable is a cable that contains multiple fiber waveguides. In this example, the ribbon-fiber cable would require N fiber waveguides to transmit light, and N fiber waveguides to receive light. In the case where the sending component would be responsible for the selection of the interconnections configuration 100, either depending on the number of components 120 in the system or depending on bandwidth capacity requirement based on the type of components 120 or based on the interconnection topology, a particular fiber waveguide would have to be used by the sending component in order to select the right backplane interconnections configuration 100.

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents that fall within the range of the claims are intended to be embraced therein.

The invention claimed is:

1. A multi-layered optical backplane, comprising:
   a plurality of component connectors;
   a first optical, passive and static network topology interconnections configuration, located in a first layer of the multi-layered optical backplane, interconnecting the component connectors; and a second optical, passive and static network topology interconnections configuration, located in a second layer of the multi-layered optical backplane, interconnecting the component connectors;

said first and second network topology interconnections configurations allowing a selection of a network topology interconnections configuration interconnecting the component connectors.

2. The multi-layered optical backplane of claim 1, wherein the selection is based on a number of components connected to the component connectors or on bandwidth capacity requirement.

3. The multi-layered optical backplane of claim 1, wherein the optical backplane is built using a polymer waveguide technology.

4. The multi-layered optical backplane of claim 1, wherein the component connectors each comprise a plurality of links, each link being connected to a different network topology interconnections configuration.

5. The multi-layered optical backplane of claim 4, wherein the component connectors each comprise a single ribbon-fiber cable containing multiple fiber waveguides and wherein each link corresponds to a fiber waveguide.

6. The multi-layered optical backplane of claim 1, wherein each network topology interconnections configuration comprises an optical crossbar on the backplane to redirect optical waveguides between the component connectors.

7. The multi-layered optical backplane of claim 1, wherein the component connectors are component slots.

8. The multi-layered optical backplane of claim 2, wherein the components are Printed Circuit Boards (PCBs).

9. A method for sending an optical signal from a sending component to a receiving component, said components being connected to a multi-layered optical backplane through component connectors, comprising the step of:
   a) selecting one of a first and a second optical, passive and static network topology interconnections configurations, located respectively in a first and a second layers of the multi-layered optical backplane, interconnecting the component connectors of the multi-layered optical backplane; and
   sending the optical signal to the receiving component through the selected network topology interconnections configuration.

10. The method for sending an optical signal of claim 9, wherein the step of selecting one of the first and second network topology interconnections configurations is based on a number of components connected to the component connectors or is based on bandwidth capacity requirement.

11. A method for receiving an optical signal at a receiving component from a sending component, said components being connected to a multi-layered optical backplane through component connectors, comprising the step of:
   a) selecting one of a first and a second optical, passive and static network topology interconnections configurations, located respectively in a first and a second layers of the multi-layered optical backplane, interconnecting the component connectors of the multi-layered optical backplane on which an optical signal is being transmitted at a given time; and
   receiving the optical signal from the sending component through the selected network topology interconnections configuration.

12. The method for receiving an optical signal of claim 11, wherein the step of selecting one of the first and second network topology interconnections configurations is based on a number of components connected to the component connectors or is based on bandwidth capacity requirement.

13. The multi-layered optical backplane of claim 2, wherein the selection is made by the components connected to the component connectors.

14. The multi-layered optical backplane of claim 1, further comprising at least one additional optical, passive and static network topology interconnections configurations, located in at least one additional layer of the optical backplane, interconnecting the component connectors.

* * * * *